United States Patent [19]

Moriguchi

[11] Patent Number: 4,490,664
[45] Date of Patent: Dec. 25, 1984

[54] STEP MOTOR EXCITING APPARATUS

[75] Inventor: Fujio Moriguchi, Kanagawa, Japan

[73] Assignee: Fuji Xerox Co., Ltd., Tokyo, Japan

[21] Appl. No.: 435,448

[22] Filed: Oct. 20, 1982

[30] Foreign Application Priority Data

Oct. 20, 1981 [JP] Japan ................ 56-166297

[51] Int. Cl.³ .......................... H02K 29/04
[52] U.S. Cl. .................... 318/696; 318/685
[58] Field of Search ............ 318/696, 685, 432

[56] References Cited

U.S. PATENT DOCUMENTS 4,336,484 6/1982 Marinko ................ 318/696

Primary Examiner—J. V. Truhe
Assistant Examiner—Saul M. Bergmann
Attorney, Agent, or Firm—Sughrue, Mion, Zinn, Macpeak and Seas

[57] ABSTRACT

An apparatus for exciting a step motor such as a step motor employed as a drive source for conveying original documents in a reading device such as a facsimile system. To vary the feed pitch in the auxiliary scanning direction of the original, staircase waveform exciting currents are applied through A-phase and B-phase exciting coils of the step motor. The apparatus of the invention provides for equal step sizes of the two waveforms and waveforms which are precise complements of one another. Currents flowing in the two exciting coils are sensed and voltages representing the sensed currents are divided in ratios determined by division ratio control signals read from a ROM. The divided signals are compared with a reference signal to provide pulse drive signals of constant currents during each step.

10 Claims, 14 Drawing Figures

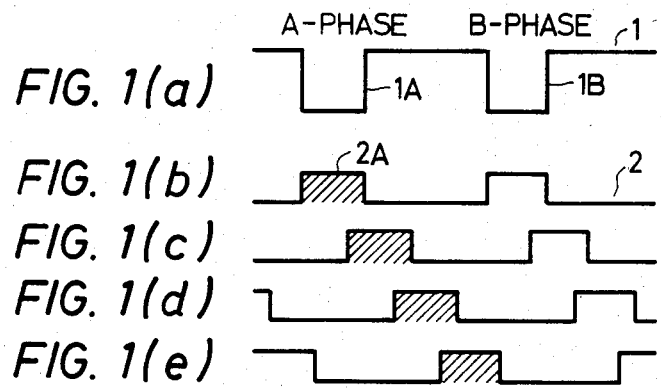
FIG. 1(a)
FIG. 1(b)
FIG. 1(c)
FIG. 1(d)
FIG. 1(e)
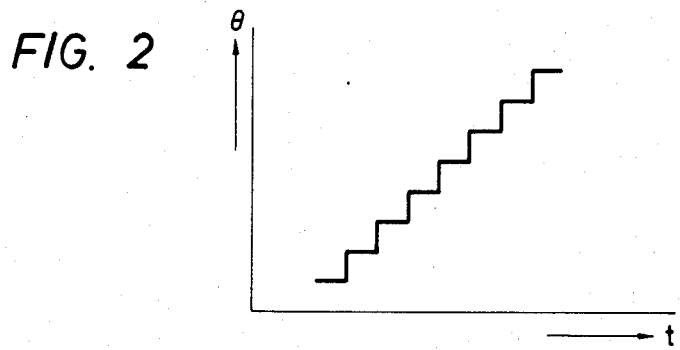
FIG. 2
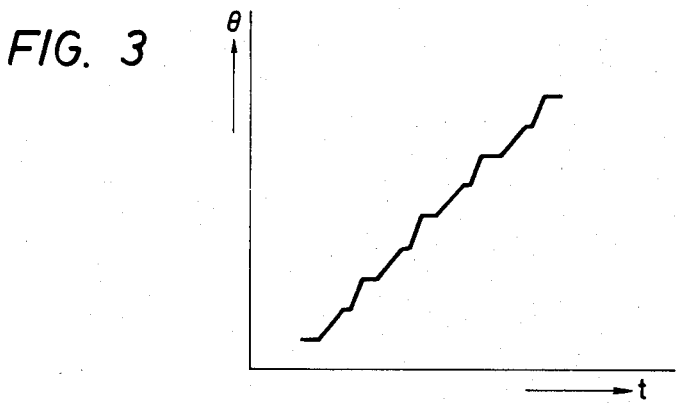
FIG. 3

STEP MOTOR EXCITING APPARATUS

BACKGROUND OF THE INVENTION

The present invention relates to an apparatus for exciting a step motor, specifically, a step motor which is employed as a drive source for conveying document originals in a reading device such as may typically be used in a facsimile system.

An original reading device of this type, which operates using a planar scanning technique, generally employs a step motor as an original conveying drive source. In such an original reading device, the feed pitch (the distance of movement in the auxiliary scanning direction as defined by the stroke length of the step motor) of one line of the original can be suitably changed so as to obtain a video signal corresponding to the image of the original which is equivalent to equal size, enlarged size or reduced size magnification settings. In order to change the original feed pitch, in one prior art approach a power transmission speed reduction mechanism is provided between the step motor and the original conveying mechanism. In this conventional system, a plurality of different speed reduction ratios are provided with the power transmission speed reduction mechanism so that the amount of movement per stroke of the step motor transmitted to the original conveying mechanism can be set by the speed reduction ratio selected by a switching device. However, this system is disadvantageous in that the magnification switching mechanism is intricate and the original reading mechanism is bulky.

In order to eliminate these difficulties, a system has been proposed in which the angle of rotation of the rotor per exciting pulse is changed. In that system, the auxiliary scanning distance (the distance between adjacent scanning lines on the original) is varied by changing the number of input pulses to the step motor, for instance, four input pulse signals for equal size magnification, three input pulse signals for enlarging magnification, and five input pulse signals for reducing magnification. In this case, the transmission speed reduction system provides a speed reduction ratio of 4:1. Unfortunately, the angular speed of the rotor is unavoidably increased because the number of input pulse signals per unit of time must be increased to maintain a desired reading speed. However, upon increasing the angular speed of the rotor, it becomes difficult to produce sufficient torque for every step of the rotor. Accordingly, it is difficult to employ such a step motor in an original reading device. In order to be effective, it is essential for the rotor to provide a relatively small angular speed so that sufficient torque is produced for every application of the input pulse signal. Accordingly, it is required that an exciting system be provided which reduces the step angle of the rotor per input pulse signal (hereinafter referred to as "a unitary step angle" when applicable).

Step motor exciting systems in which the unitary step angle of the rotor is reduced include a proposed so-called "exciting current unbalance type W1-2 phase exciting system". In this sytem, exciting currents supplied to the exciting coils of the step motor driven in 1-2 phase excitation are suitably switched between two values which are in a predetermined ratio, whereby the unitary step angle is reduced.

FIG. 1 is a waveform diagram for a description of the stepping operation of a rotor in which the W1-2 phase exciting system is employed. FIG. 1(a) shows the position of the stator, and FIGS. 1(b) through 1(c) show the positions of the rotor with respect to the stator. When a current of one ampere, for instance, is supplied to a first phase exciting coil (not shown and hereinafter referred to as "an A-phase exciting coil" when applicable), the pole piece 1A of the stator on which the A-phase exciting coil is wound is excited. At the same time, as shown in FIG. 1(b), the rotor 2 is stepped to a position where the pole piece 2A of the rotor directly confronts the pole piece 1A of the stator. When, under this condition, a current of 0.4 ampere, for instance, is supplied to the second phase exciting coil (not shown and hereinafter referred to as "a B-phase exciting coil" when applicable), the pole piece 1B of the stator on which the B-phase exciting coil is wound is excited.

The currents supplied to the A-phase and B-phase exciting coils are different in value from each other, and therefore the magnetic energy produced in the pole piece 1A of the stator is different from that produced in the pole piece 1B. Because of this, the rotor 2 steps until the pole piece 2A comes to a predetermined distance from the pole piece 1A between the pole pieces 1A and 1B, nearer the pole piece 1A than the pole piece 1B, as indicated in FIG. 1(c). When currents of one ampere are supplied to the A-phase and B-phase exciting coils, the magnetic energy produced in the pole piece 1A is equal to that produced in the pole piece 1B. In that case, the rotor 2 steps until the pole piece 2A reaches the midpoint between the pole pieces 1A and 1B, as shown in FIG. 1(d). When, under this condition, the current supplied to the A-phase exciting coil is changed from one ampere to 0.4 ampere, the magnetic energy in the pole piece 1A becomes different from that in the pole piece 1B. Accordingly, the rotor 2 steps until the pole piece 2A comes to a predetermined distance from the pole piece 1B between the pole pieces 1A and 1B, nearer the pole piece 1B than the pole piece 1A. As is clear from the above description, when the rotor steps four times successively, an operation of rotation for one step angle, corresponding to the unitary step angle in the single-phase exciting system, is effected.

FIG. 2 is a graph plotting the angular position of the rotor with time under no load with the step motor being driven in accordance with the W1-2 phase exciting system. In FIG. 2, t designates time, and $\theta$ the angle of rotation of the rotor.

Under the condition that no load is applied, the rotor repeats stepping and stopping quickly whenever an input pulse signal is applied thereto, thus exhibiting the regular staircase characteristic curve shown in FIG. 2. On the other hand, if the step motor is employed in a conveying system in which a relatively large load is imposed on the motor, the characteristic curve of rotation becomes as shown in FIG. 3. In this case, the torque produced is not large, and the rotor steps relatively slowly. In the W1-2 phase exciting system, the current supplied to each exciting coil is changed in two steps, and therefore four exciting phases are provided. In the general case, as the number of steps in which the exciting current is changed is reduced, the magnetic energy produced for each exciting phase, and therefore the torque produced during the stepping of the rotor is not uniform among all steps. Accordingly, the stepping speed of the rotor fluctuates as illustrated.

Assuming that the amount of movement of an original which is provided when the rotor is stepped four times successively is equal to an auxiliary scanning width (scanning line spacing) and one cycle of four exciting states as described above is completed every auxiliary scanning for each line of the original, the reading scanning density is uniform for every line, as shown in FIG. 4(a). In this operation, a video signal accurately representing the character "A" is obtained. However, if the movement of the original is not uniform for the reasons discussed above, the reading scanning density will not be uniform among all lines. In this case, a correct video signal cannot be obtained for the character "A".

In view of the foregoing, an object of the present invention is to provide a step motor exciting system in which uniform torque is produced for every step of the rotor, even when the step motor is under load.

SUMMARY OF THE INVENTION

The foregoing and other objects of the invention have been achieved by the provision of a step motor exciting system which comprises current setting means for switching, in at least four steps, an exciting current supplied to each phase exciting coil of the step motor, and in which exciting currents having a regular staircase waveform and which are complementary in current level are passed through the phase current coils.

More specifically, the foregoing and other objects of the invention are satisfied by an apparatus for exciting a step motor having first and second spaced exciting coils including means for sensing currents flowing in each of first and second exciting coils, means for applying first and second exciting currents to the first and second exciting coils, respectively, in response to the sensed currents and in a ratio determined by respective first and second control signals, and means for producing the first and second control signals for varying the ratio in a plurality of successive equal steps. By varying the ratio in this manner, the first and second exciting coils are provided with regular staircase waveforms which are complementary in current levels. By producing these currents in response to the sensed currents flowing in the two exciting coils, it is ensured that the exciting currents are constant during each step, thereby producing a uniform torque for each step of the rotor, even when the motor is under load.

In a preferred embodiment, the sensed currents are each divided by a division ratio set by the corresponding one of the first and second control signals. The divided voltage is compared with a reference signal, which may be a triangular-wave signal superposed upon a DC voltage. The comparison output, which is representative of a constant-current signal, is applied through a driver to produce the corresponding exciting current. A ROM addressed by a continuously cycling counter can be employed for producing the division signals.

BRIEF DESCRIPTION OF THE DRAWINGS

FIGS. 1a–1e are explanatory diagrams for a description of the rotation of the rotor in a step motor which is driven according to a conventional W1-2 phase excitation system;

FIG. 2 is a graphical representation indicating the angle of rotation of the step motor under no load;

FIG. 3 is a graphical representation indicating the angle of rotation of the step motor under load;

DESCRIPTION OF THE PREFERRED EMBODIMENTS

The invention will now be described with reference to preferred embodiments thereof.

Figures 4A, 4B:
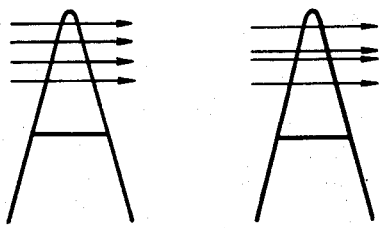
FIGS. 4a–4b are explanatory diagrams for a description of the differences in reading scanning density between two methods of exciting the step motor.
Figure 5:
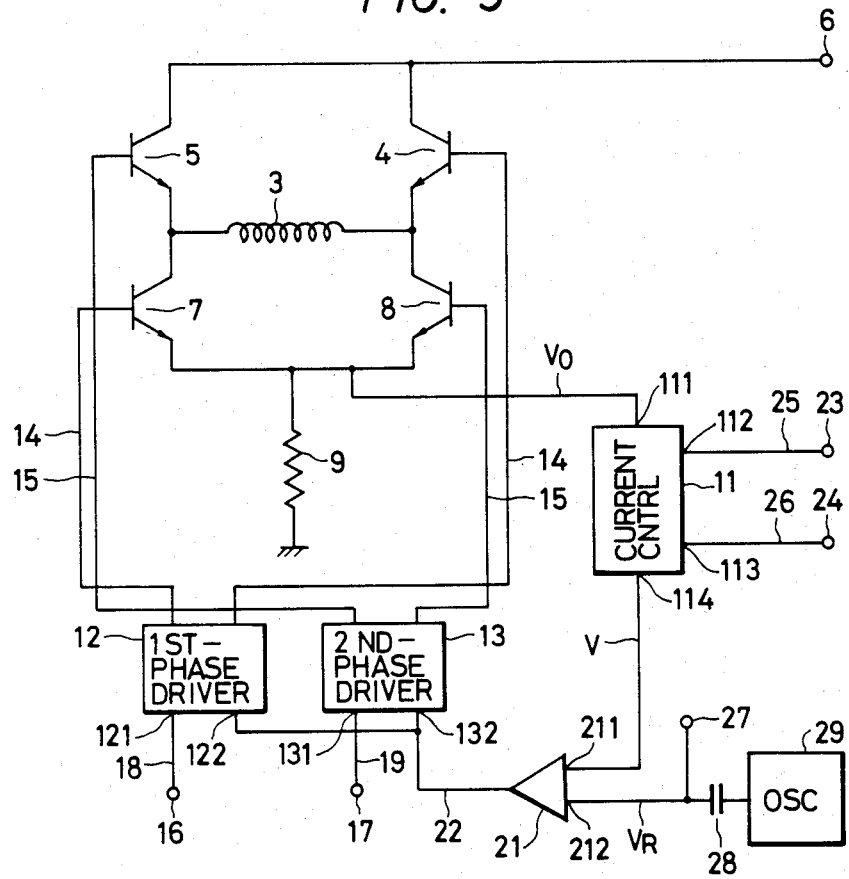
FIG. 5 is a circuit diagram of a step motor drive circuit for describing a step motor exciting system according to the invention.

FIG. 5 shows a step motor drive circuit for a single phase coil in a step motor exciting system according to the invention. With this drive circuit, two-phase bipolar excitation is provided for an exciting coil 3. The exciting coil 3 is wound on a pole piece (not shown) of the stator. The end terminals of the exciting coil 3 are connected to the emitters of first and third switching driver transistors 4 and 5, respectively, the collectors of which are connected to an exciting current supplying power source terminal 6. Also, the end terminals of the exciting coil 3 are connected to the collectors of second and fourth switching driver transistors 7 and 8, respectively, the emitters of which are commonly grounded through a current detecting resistor 9 and are commonly connected to an input terminal 111 of a current control circuit 11. Control signals 14 and 15 having levels suitable for implementing control of the transistors 4, 5, 7 and 8 are supplied to the bases of the first and second transistors 4 and 7 and to the bases of the third and fourth transistors 5 and 8, respectively, by a first-phase driver circuit 12 and a second-phase driver circuit 13, respectively. Respective first input terminals 121 and 131 of the first and second-phase driver circuits 12 and 13 are connected to control signal input terminals 16 and 17 to receive control signals 18 and 19 used to enable a selected one of first- and second-phase excitations, respectively. Second input terminals 122 and 132 of the circuits 12 and 13 are commonly connected to the output terminal of a comparator 21 to receive a comparison result signal 22.

The current control circuit 11, which is implemented with a voltage divider circuit, has control signal input terminals 112 and 113 connected to receive corresponding voltage division control signals 25 and 26, used for setting a division ratio, on input terminals 23 and 24, respectively. The output terminal 114 of the current control circuit 11 is connected to the comparison voltage input terminal 211 of the comparator 21 to apply as an input voltage V to the input terminal 211 one of a voltage $V_0$ developed at one end of the current detecting resistor 9, a first divided voltage $V_1$, a second divided voltage $V_2$ and a third divided voltage $V_3$, the latter three being produced by dividing the voltage $V_0$. The other input terminal, namely, a reference voltage input terminal 212 of the comparator 21, is connected to a constant voltage input terminal 27 and to an oscillator circuit 29 through a DC blocking capacitor 28. In this arrangement, a reference voltage $V_R$ is obtained by superposing a triangular-wave signal produced by the oscillator circuit 29 on the constant voltage provided through the constant voltage input terminal 27. The two voltages V and $V_R$ are compared by the comparator 21. When $V \geq V_R$, the comparator 21 outputs a comparison result signal 22. The first-phase and second-phase driver circuits 12 and 13, on receiving the comparison signal 22 and the control signals 18 and 19, render pairs of the transistors 4, 5, 7 and 8 conductive as determined by the states of these signals.

When the step motor is excited by the drive circuit and exciting current is supplied to the exciting coil 3, the voltage $V_0$ which is proportional to the current value, is developed at the ungrounded end of the current detecting resistor 9. As the exciting current rises (at a rate determined by the time constant of the circuit), the voltage $V_0$ increases. When neither of the voltage division control signals 25 and 26 are applied to the current control circuit 11, the voltage $V_0$ is outputted without modification and applied as the input voltage V to the comparator 21. In response thereto, the comparator 21 outputs the comparison signal 22 continuously until the input voltage V becomes equal to the reference voltage $V_R$. So long as the input voltage V is equal to or exceeds the reference voltage $V_R$, the comparator 21 outputs the comparison signal 22 intermittently in accordance with the reference voltage $V_R$. The first-phase driver circuit 12 or the second-phase driver circuit 13, in response to the comparison signal 22, outputs one of the control signals 14 and 15 to turn the respective transistor pairs 4 and 7, and 5 and 8, on and off, and off and on, respectively. With the above-described arrangement, the exciting current during transient times is subjected to constant current control.

When one voltage division control signal 25 is applied to the current control circuit 11 but the other voltage division control signal 25 is not applied thereto, the current control circuit 11 carries out a first voltage dividing operation. In this case, the first divided voltage $V_1$ is generated by dividing the voltage $V_0$ by a first preset voltage division ratio, and the voltage $V_1$ is applied as the input voltage V to the comparator 21.

When the voltage division control signal 25 is not applied to the current control circuit 11 but the other voltage division control signal 26 is applied thereto, the current control circuit 11 carries out a second voltage dividing operation, in which case the second divided voltage $V_2$ is obtained by dividing the voltage $V_0$ by a second preset voltage division ratio. The voltage $V_2$ is applied as the input voltage to the comparator 21. When the two voltage division control signals 25 and 26 are simultaneously supplied to the current control circuit 11, the circuit 11 carries out a third voltage dividing operation. In this operation, the third divided voltage $V_3$ is obtained by dividing the voltage $V_0$ by a third preset voltage division ratio and then applied as the input voltage V to the comparator 21. The comparison operations of the comparator 21 which are carried out when the voltages are applied thereto are as described above. The first, second and third divided voltages $V_1$, $V_2$ and $V_3$ have magnitudes which satisfy $V_0 > V_1 > V_2 > V_3$.

When the voltage applied to the comparator 21 is changed in four steps as described above, the exciting current flowing in the exciting coil 3 is changed in four steps having relative magnitudes determined by the voltage division ratios. That is, the magnitude of the magnetic energy which is produced in the first-phase or second-phase excitation can be changed in four steps. It goes without saying that, by increasing the number of voltage dividing operations which can be performed by the current control circuit 11, the voltage can be divided in more than four steps, and hence the magnitude of the magnetic energy can be divided in more steps.

Figure 6:
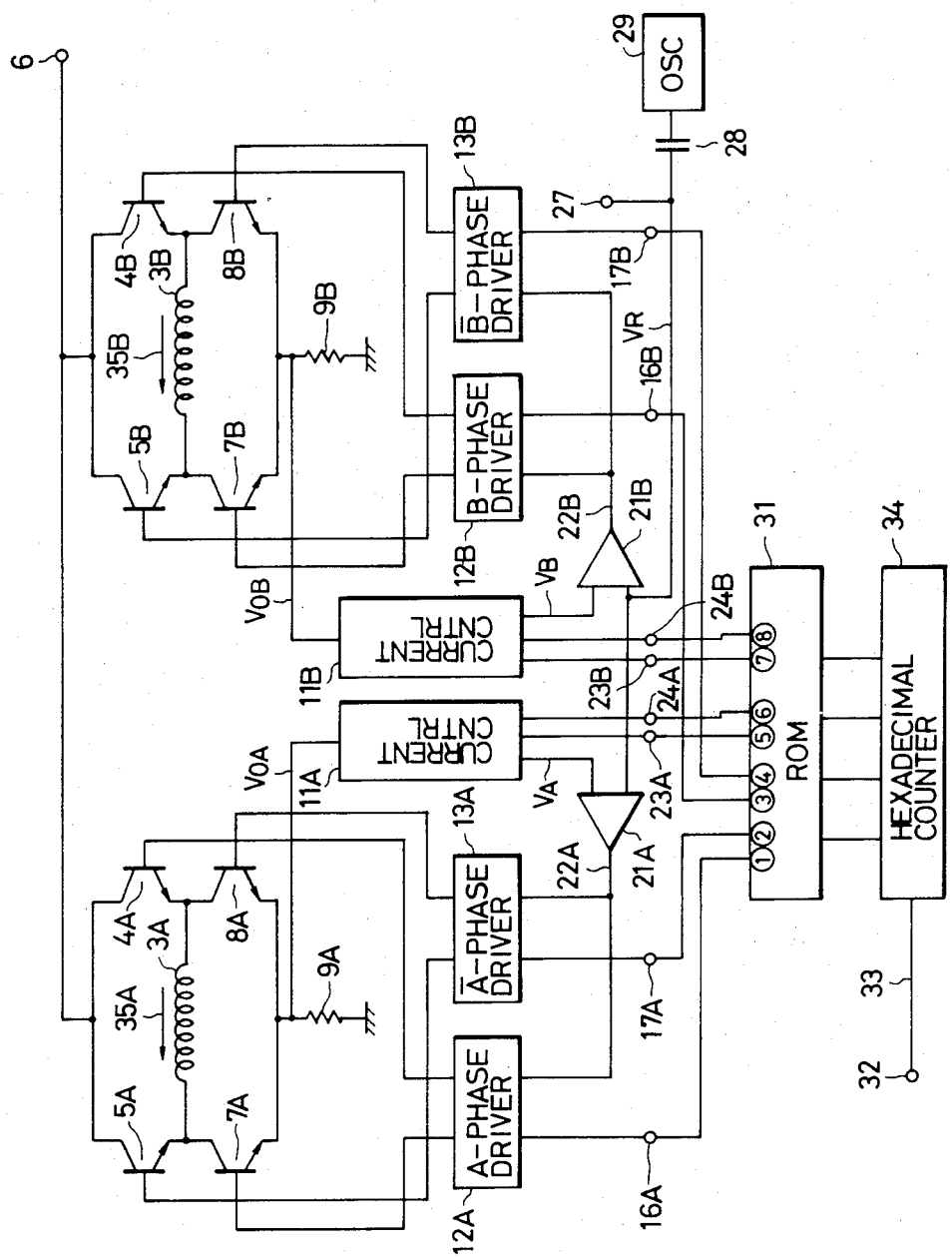
FIG. 6 is a circuit diagram showing a four-phase step motor drive circuit of the invention.

The driving of the step motor using W1-2 phase excitation according to the exciting system described above will now be described more specifically. FIG. 6 shows a drive circuit for a four-phase step motor having exciting phases A, $\overline{A}$, B and $\overline{B}$. The circuit in FIG. 6 is used to perform bipolar excitation of two exciting coils wound around the pole pieces of the stator (not shown). In FIG. 6, the right- and left-hand circuit portions for driving the two exciting coils have the same arrangement, with that arrangement being the same as shown in FIG. 5. Accordingly, circuit elements corresponding to those already described with reference to FIG. 5 are designated by corresponding reference numerals or characters, with suffixes A or B denoting left- and right-hand portions, respectively.

In the drive circuit of FIG. 6, the control signal input terminals 16A, 17A, 16B and 17B and the voltage division control signal input terminals 23A, 24A, 23B and 24B are connected to respective output terminals $M_1$ through $M_8$ of a ROM (Read-Only Memory) 31. The ROM 31, which is addressed by a hexadecimal counter 34 incremented by a pulse signal 33 applied on a step pulse input terminal 32, outputs logic signals at predetermined levels through the output terminals $M_1$ through $M_8$.

When the power switch of the step motor drive circuit thus constructed is turned on, address "0" in the ROM 31 is first accessed. In this operation, H (high) level logic signals are outputted at the output terminals $M_1$, $M_5$ and $M_6$ of the ROM 31, and L (low) level logic signals are outputted at the remaining output terminals $M_2$, $M_3$, $M_4$, $M_7$ and $M_8$. As a result, the A-phase driver circuit 12A, which receives the comparison signal 22A from the comparator 21A, is enabled, thereby rendering the first and second transistors 4A and 7A conductive, whereby an A-phase exciting current flows in the exciting coil 3A in the direction of the arrow 35A. A voltage $V_{0A}$, which is produced at one end of the current detecting resistor 9A and which has a magnitude in proportion to the A-phase exciting current, is applied to the current control circuit 11A. When address "0" is accessed as described above, the logic signals inputted to the current control circuit 11A are at the H level, and therefore the current control circuit 11A carries out the third voltage dividing operation. Accordingly, the voltage $V_{0A}$ is divided by the third voltage division ratio, so that the third divided voltage $V_{3A}$ is applied as the input voltage $V_A$, to the comparator 21A. The third voltage division ratio may be, for example 2/7. In that case, the magnitude of the A-phase exciting current, which is subjected to constant current control by the comparison operation of the comparator 21A, is 7/2 times the magnitude of the current which is provided when voltage division is not carried out by the current control circuit 11, that is, when the voltage $V_{0A}$ is applied directly to the comparator 21. This current value is set, for instance, at 1.4 amperes. When single phase excitation of the A-phase only is carried out as described above, the rotor, being attracted by the pole piece of the stator forming the excitation phase, steps to the position indicated in FIG. 1(b).

After this operation, a pulse signal 33 is supplied to the counter 34, and address "1" in the ROM 31 is accessed. At the same time, H level logic signals are provided at the output terminals $M_1$, $M_3$ and $M_6$ of the ROM 31, and L level logic signals are provided at the remaining output terminals $M_2$, $M_4$, $M_5$, $M_7$ and $M_8$ of the ROM 31. Accordingly, in the current control circuit 11A, the second voltage division ratio is then used to divide the voltage $V_{0A}$. The second voltage division ratio is, in the instant example, 2/5. Therefore, in the example under discussion, the value of the A-phase exciting current, which is subjected to constant current control by the comparison operation of the comparator 21A, is changed to 1 ampere from 1.4 amperes.

While the address "1" in the ROM 31 is accessed, the B-phase driver circuit 12B is enabled to render the first and second transistors 4B and 7B conductive, as a result of which a B-phase exciting current flows in the exciting coil 35B in the direction of the arrow 35B. The magnitude of the voltage $V_{OB}$ developed at the ungrounded end of the current detecting resistor 9B and which is applied to the current control circuit 11B, is in proportion to the B-phase exciting current. While address "1" is accessed, all the logic signals applied to the current control circuit 11B are at the L level, and accordingly the current control circuit 11B performs no voltage dividing operation. That is, the voltage $V_{OB}$ is applied directly as an input voltage $V_B$ to the comparator 21B. When the voltage $V_{OB}$ is not divided, the value of the B-phase exciting current, which is subjected to constant current control by the comparator 21B, becomes a minimum. This current value is, in the present example, 0.4 ampere. In this case where the A-phase exciting current is larger than the B-phase exciting current, the magnetic energy produced in the pole piece of the stator upon which is wound the exciting coil 3A is larger than that produced in the pole piece of the stator upon which is wound the exciting coil 3B, so that the rotor steps to the position indicated in FIG. 1(c).

When address "2" in the ROM 31 is accessed, H level logic signals are provided at the output terminals $M_1$, $M_3$, $M_5$ and $M_7$, while L level logic signals are provided at the remaining output terminals $M_2$, $M_4$, $M_6$ and $M_8$. Accordingly, in the current control circuit 11A, the third voltage division ratio is employed to divide the voltage $V_{OA}$. At the same time, the current control circuit 11B divides the voltages $V_{OB}$ by the first voltage division ratio. The first voltage division ratio is, for instance, 4/7. In this case, the A-phase and B-phase exciting currents flowing in the exciting coils 3A and 3B are controlled to 0.7 ampere. When A-phase and B-phase simultaneous excitation in which the exciting currents are equal in value to each other is carried out, the magnetic energy produced in the pole piece of the stator on which the exciting coil 3A is wound is equal to that produced in the pole piece on which the exciting coil 3B is wound, and therefore the rotor steps to the position indicated in FIG. 1(d).

When address "3" in the ROM 31 is accessed, H level logic signals are provided at the output terminals $M_1$, $M_3$ and $M_8$, while L level logic signals are provided at the remaining output terminals $M_2$, $M_4$, $M_5$, $M_6$ and $M_7$. As a result, the voltage $V_{OA}$ is applied directly as the input voltage $V_A$ to the comparator 21A. Therefore, the A-phase exciting current flowing in the exciting coil 3A is controlled to the minimum value of 0.4 ampere. In the current control circuit 11B, the second voltage division ratio is than employed so that the B-phase exciting current flowing in the exciting coil 3B is controlled to one ampere. In this mode where the B-phase exciting current is larger than the A-phase exciting current, the rotor steps to the position indicated in FIG. 1(e).

Figure 7A:
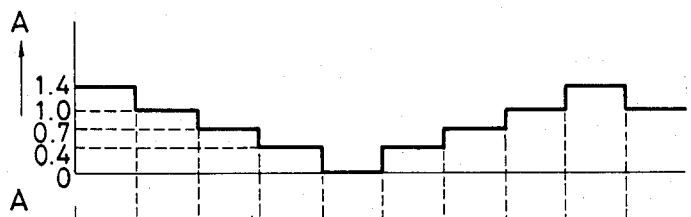
FIGS. 7a–7c are waveform diagrams showing applied exciting currents as functions of time.
Figure 7B:
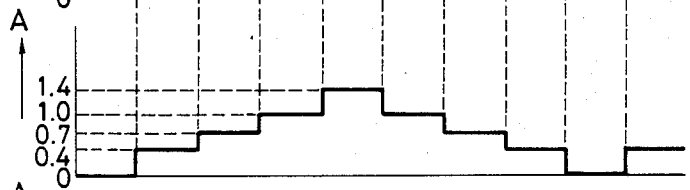
Figure 7C:
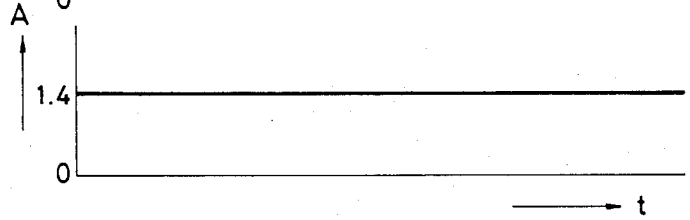

Thereafter, as the addresses in the ROM 31 are cyclically accessed, excitation control is carried out as described above so that the W1-2 phase excitation is continuously effected for the A, $\overline{A}$, B and $\overline{B}$ phases. FIG. 7(a) indicates the variations of the exciting current in the exciting coil 3A (FIG. 6) with time t, while the FIG. 7(b) illustrates the variations of the exciting current in the exciting coil 3B. By varying the values of the exciting currents stepwise in the above-described ratios, the single step angle of the rotor 3 is reduced to a quarter of the unitary step angle in the single-phase exciting system, and the torque produced at the various steps of the rotor is made equal among all steps. The exciting currents in the exciting coils 3A and 3B (FIG. 6) are varied complementarily as described above, as a result of which the sum of the exciting currents are averaged as shown in FIG. 7(c).

As is apparent from the above description, in accordance with the invention, excitation control is carried out using a relatively simple circuit structure. Thus, the system according to the invention is quite economical.

In the above-described embodiment, the exciting current is described as being changed in four steps. However, it should be noted that the invention is not limited thereto or thereby, that is, the exciting current may be changed in more than four steps. Furthermore in the described embodiment, bipolar excitation is effected. However, it goes without saying that the technical concept of the invention is applicable to unipolar excitation. The specific values of the exciting currents described above may be varied suitably according to the arrangement of the step motor employed and a desired step response characteristic. Moreover in the preferred embodiment above, a voltage obtained by superposing a triangular-wave signal upon a DC voltage is employed as a reference voltage. However, the reference voltage may be obtained by superposing a signal such as a square-wave signal on a DC voltage.

I claim:

1. An apparatus for exciting a step motor having at least first and second phase exciting coils, comprising:
   means for sensing currents flowing in each of said first and second exciting coils;
   means for applying first and second exciting currents to said first and second exciting coils, respectively, in response to the sensed currents in a ratio determined by respective first and second control signals; and
   means for producing said first and second control signals for varying said ratio in a plurality of successive equal steps, said first and second exciting currents thereby varying complementarily in a staircase fashion such that the total of said exciting currents remains a constant.

2. The exciting apparatus of claim 1, wherein said means for applying said first and second exciting currents comprises:
   first and second dividing means for dividing first and second sensed current values, respectively, sensed by said sensing means, by division ratios determined by said first and second control signals, respectively;
   means for comparing first and second division signals produced by dividing said first and second sensed current values by said first and second division ratios, respectively, with a reference signal; and
   means for producing said first and second exciting currents in response to first and second comparison results produced by said first and second comparing means, respectively.

3. The exciting apparatus of claim 2, wherein said means for producing said first and second control signals comprises a read-only memory and continuously cycling counter means addressing said read-only memory.

4. The exciting apparatus of claim 2, wherein said reference signal is a triangular-wave signal superposed upon a DC signal.

5. The exciting apparatus of claim 2, wherein said reference signal is a square-wave signal superposed upon a DC signal.

6. The exciting apparatus of claim 2, wherein said means for producing said first and second exciting currents comprises first and second driver circuits for passing each of said first and second exciting currents through the corresponding first and second exciting coils in a direction determined by an output of said means for producing said first and second control signals.

7. An apparatus for exciting a step motor having A-phase and B-phase exciting coils, comprising:
(1) A-phase and B-phase current control circuits, each of said current control circuits comprising:
  (a) first through fourth driver transistors, said first and second driver transistors having collectors connected commonly to a first power source terminal and emitters coupled to respective opposite ends of the corresponding exciting coil, said third and fourth driver transistors having collectors connected to said respective opposite ends of said corresponding exciting coils and emitters coupled commonly;
  (b) a sensing resistor having a first terminal coupled to said commonly connected emitters of said third and fourth drive transistors and a second terminal coupled to a second power source terminal;
  (c) a current control circuit comprising an analog signal divider having a signal input coupled to said first terminal of said sensing resistor;
  (d) a comparator having a first comparison input coupled to a division signal output of said current control circuit;
  (e) first and second drivers, said first driver turning on said first and third transistors in response to a comparison output produced by said comparator and said second driver turning on said second and fourth driver transistors in response to said output of said comparator;
(2) means for producing a reference signal, said reference signal being applied to a second comparison input of each of said comparators;
(3) a read-only memory having outputs coupled to division ratio control inputs of each of said current control circuits and enabling inputs of each of said first and second drivers; and
(5) a continuously cycling counter coupled to address said read-only memory.

8. The exciting apparatus of claim 7, wherein said reference signal is a triangular-wave signal superposed upon a DC signal.

9. The exciting apparatus of claim 7, wherein said reference signal is a square-wave signal superposed upon a DC signal.

10. The exciting apparatus of claim 7, wherein said read-only memory is programmed to provide division ratio control signals to said current control circuits such that exciting currents flowing in said A-phase and B-phase exciting tools vary with staircase waveforms of constant step size which are complementary to each other.

* * * * *